(12) United States Patent
Chiang et al.

(10) Patent No.: US 9,902,198 B1
(45) Date of Patent: Feb. 27, 2018

(54) FREE WHEEL MECHANISM AND MOVING APPARATUS HAVING THE SAME

(71) Applicants: NANNING FUGUI PRECISION INDUSTRIAL CO., LTD., Nanning (CN); HON HAI PRECISION INDUSTRY CO., LTD., New Taipei (TW)

(72) Inventors: Shu-Hao Chiang, New Taipei (TW); Wen-Hsing Hsu, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/382,705

(22) Filed: Dec. 18, 2016

(51) Int. Cl.
*B60B 33/00* (2006.01)
*B62D 61/08* (2006.01)
*B60B 33/04* (2006.01)

(52) U.S. Cl.
CPC ........ *B60B 33/0068* (2013.01); *B60B 33/045* (2013.01); *B62D 61/08* (2013.01); *B60B 2900/313* (2013.01)

(58) Field of Classification Search
None
See application file for complete search history.

(56) References Cited

U.S. PATENT DOCUMENTS

| | | | | |
|---|---|---|---|---|
| 5,503,416 A * | 4/1996 | Aoki | ................... | A61B 6/4405 16/35 R |
| 5,774,936 A * | 7/1998 | Vetter | ................... | B60B 33/021 16/35 R |
| 6,332,240 B1 * | 12/2001 | Wu | ................... | B60B 33/001 16/18 R |
| 6,336,524 B1 * | 1/2002 | Van Loon | ........... | B60B 33/0018 16/35 R |
| 6,463,624 B1 * | 10/2002 | Su | ................... | B60B 33/0002 16/20 |
| 8,051,533 B2 * | 11/2011 | Block | ................... | B60B 33/0028 16/35 R |
| 8,365,354 B1 * | 2/2013 | Fan | ................... | B60B 33/04 16/18 R |

(Continued)

FOREIGN PATENT DOCUMENTS

DE 102011054200 A1 * 4/2013 .......... B60B 33/001
DE 202013101872 U1 * 5/2013 .............. A47D 1/00

*Primary Examiner* — Nicole T Verley
(74) *Attorney, Agent, or Firm* — ScienBiziP, P.C.

(57) ABSTRACT

A free wheel mechanism includes a basic assembly, a fastening member, a sleeve, a rotating member, a first elastic member, and a second elastic member. The basic assembly comprises a base, a guiding rod, and a free wheel. A guiding hole is defined in the fastening member to receive the guiding rod. One end of the sleeve is received in the guiding hole. The rotating member is positioned in a through hole of the sleeve. The first elastic member is coiled around the guiding rod, and opposite sides of the first elastic member resist against the base and the sleeve on opposite sides. The second elastic member is received in the through hole, and opposite sides of the second elastic member elastically abuts the rotating member and the guiding rod on opposite sides. Meanwhile, a moving apparatus with the free wheel mechanism is provided.

20 Claims, 7 Drawing Sheets

(56) References Cited

U.S. PATENT DOCUMENTS

| | | | | |
|---|---|---|---|---|
| 8,424,887 B1* | 4/2013 | LeMeur, Jr. | B60B 33/04 | 16/18 R |
| 8,499,413 B1* | 8/2013 | Tsai | B60B 33/02 | 16/35 R |
| 8,776,314 B2* | 7/2014 | Hofrichter | B60B 33/0042 | 16/35 R |
| 8,991,007 B2* | 3/2015 | Tsai | B60B 33/0086 | 16/35 R |
| 9,139,043 B1* | 9/2015 | Fan | B60B 33/0028 | |
| 9,139,044 B1* | 9/2015 | Tsai | B60B 33/021 | |
| 9,387,723 B2* | 7/2016 | Beatty | B60B 33/021 | |
| 2003/0192145 A1* | 10/2003 | Lai | B60B 33/0002 | 16/19 |
| 2004/0107534 A1* | 6/2004 | Hsiao | B60B 33/045 | 16/44 |
| 2004/0117943 A1* | 6/2004 | Block | B60B 33/0039 | 16/18 R |
| 2007/0056141 A1* | 3/2007 | Armano | B60B 33/0021 | 16/35 R |
| 2007/0284501 A1* | 12/2007 | Liu | B60B 33/0002 | 248/352 |
| 2008/0092329 A1* | 4/2008 | Chou | B60B 33/0021 | 16/45 |
| 2009/0139804 A1* | 6/2009 | Lin | B60B 33/0021 | 188/1.12 |
| 2010/0077562 A1* | 4/2010 | Block | B60B 33/0028 | 16/46 |
| 2012/0255141 A1* | 10/2012 | Lin | B60B 33/0081 | 16/45 |
| 2013/0319800 A1* | 12/2013 | Jiang | A45C 5/145 | 188/69 |
| 2014/0317880 A1* | 10/2014 | Yang | B60B 33/0042 | 16/29 |
| 2015/0360512 A1* | 12/2015 | Tsai | B60B 33/0018 | 16/38 |

* cited by examiner

FREE WHEEL MECHANISM AND MOVING APPARATUS HAVING THE SAME

FIELD

The subject matter herein generally relates to free wheel mechanism and moving apparatus having the same.

BACKGROUND

A moving apparatus such as a mobile robot, a wheeled luggage, or a scooter has a free wheel. The mobile robot may have a free wheel, two driving wheels, and two motors. The two motors can drive the two driving wheels to control the mobile robot. Meanwhile, the mobile robot can move towards different directions by the free wheel and control a rotating speed of the two driving wheels. However, the mobile robot's shake absorbing performance can be improved upon when the mobile robot moves on a rugged road or when the two motors work out of step.

BRIEF DESCRIPTION OF THE DRAWINGS

Implementations of the present technology will now be described, by way of example only, with reference to the attached figures.

DETAILED DESCRIPTION

Figure 1:
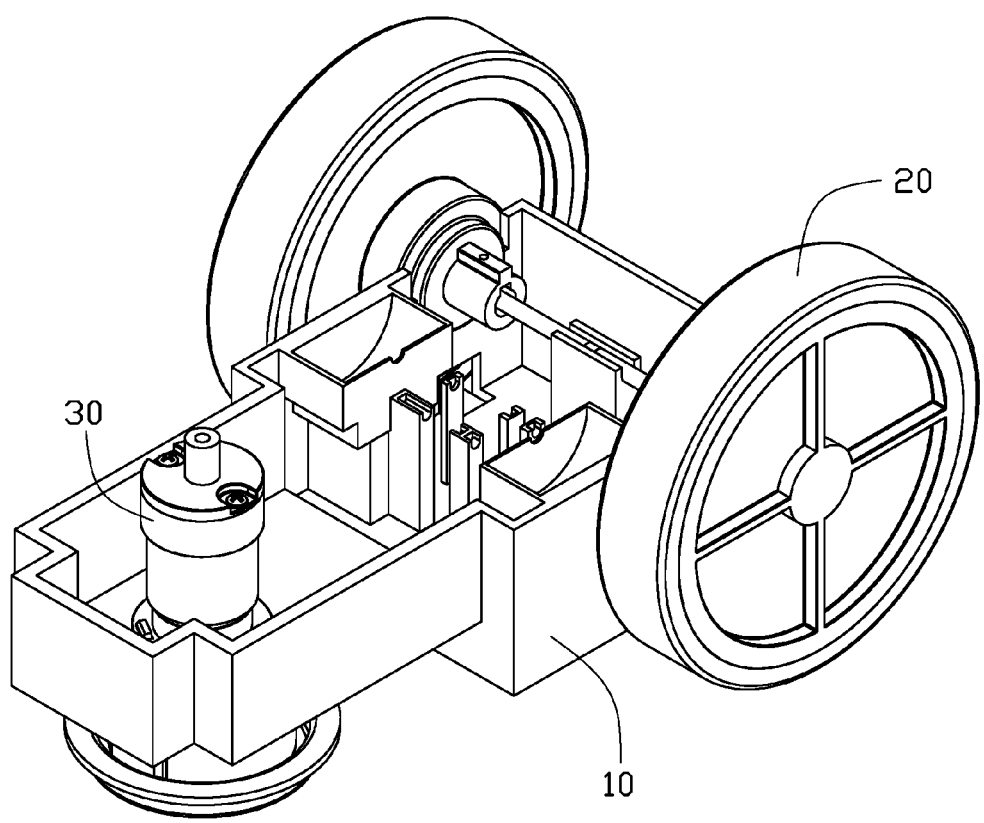
FIG. 1 is an isometric part view of an exemplary embodiment of a moving apparatus, and the moving apparatus includes a free wheel mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape or other feature that the term modifies, such that the component need not be exact. For example, "substantially cylindrical" means that the object resembles a cylinder, but can have one or more deviations from a true cylinder. The term "comprising," when utilized, means "including, but not necessarily limited to", it specifically indicates open-ended inclusion or membership in the so-described combination, group, series and the like.

The present disclosure is described in relation to a moving apparatus.

FIG. 1 illustrates an exemplary embodiment of a moving apparatus 100. The moving apparatus 100 can include a main body 10, two driving wheels 20, and a free wheel mechanism 30. The two driving wheels 20 can be rotatably positioned on opposite sides of the main body 10 to drive the moving apparatus 100. The free wheel mechanism 30 can be positioned on the main body 10 to control a moving direction of the moving apparatus 100. In the illustrated exemplary embodiment, the moving apparatus 100 can be a moving vehicle such as a motorcycle, a car, or a scooter.

Figure 2:
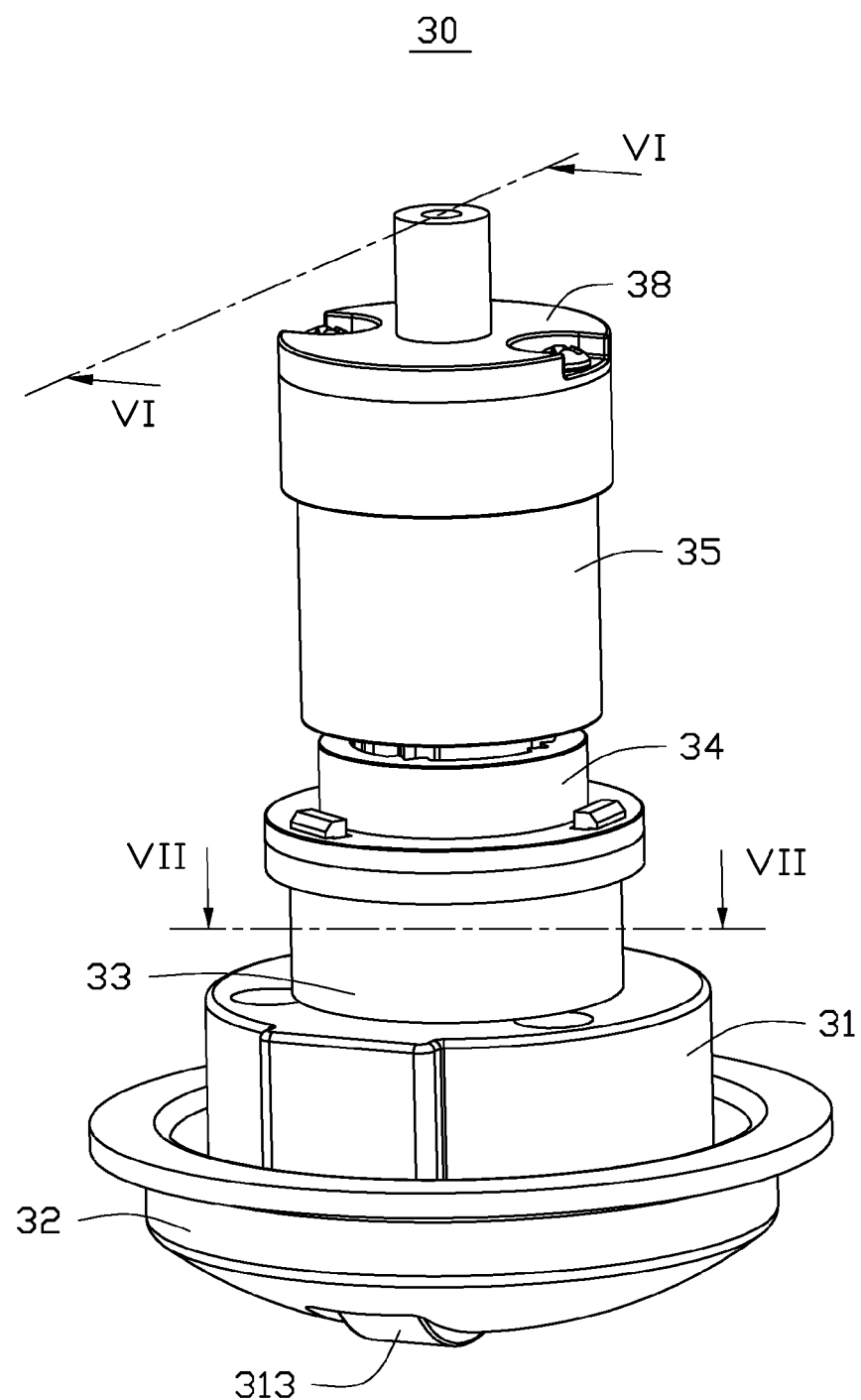
FIG. 2 is an isometric view of the free wheel mechanism of FIG. 1.
Figure 3:
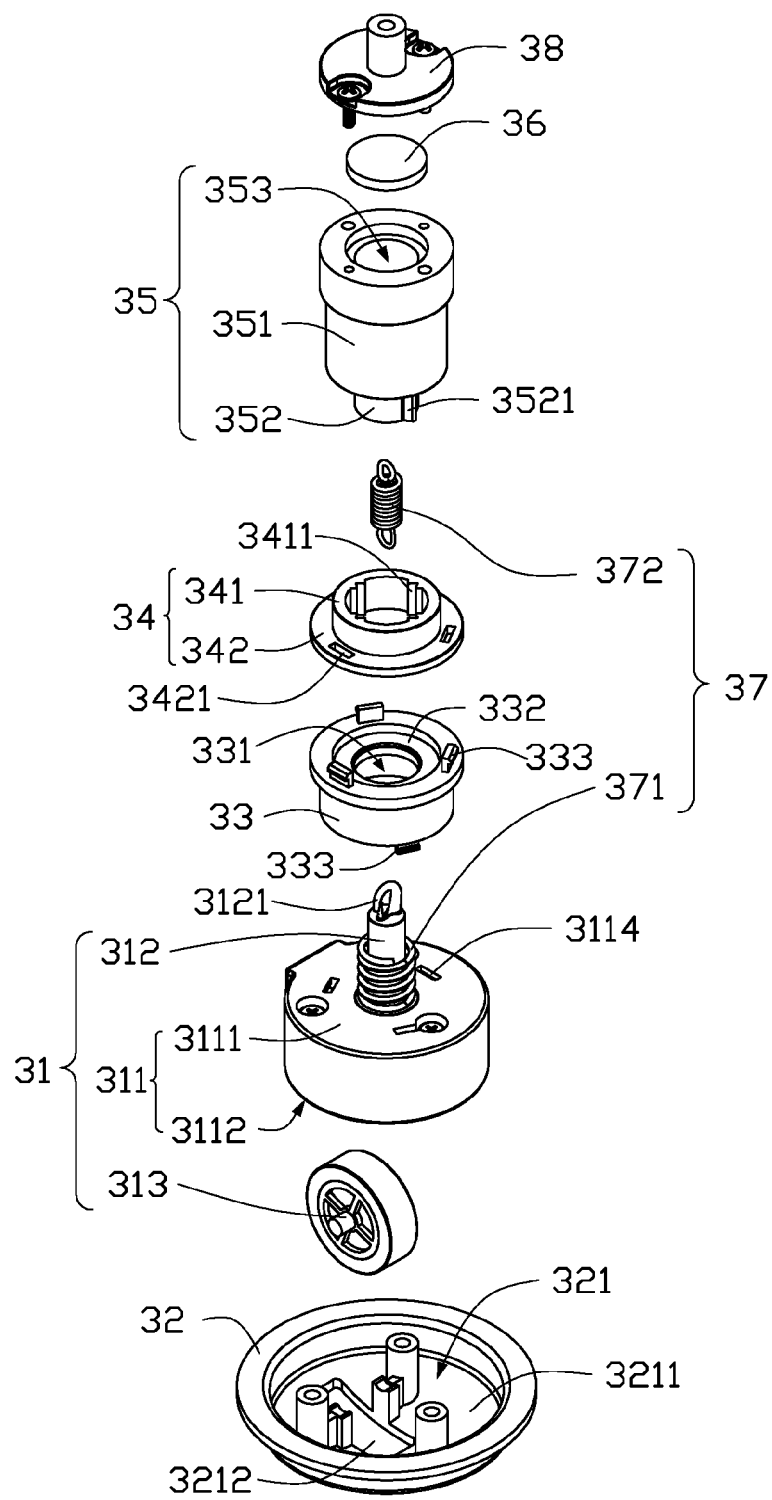
FIG. 3 is an exploded, isometric view of the free wheel mechanism of FIG. 2.

FIG. 2 and FIG. 3 show that the free wheel mechanism 30 can include a basic assembly 31, a base plate 32, a fastening member 33, a restriction member 34, a sleeve 35, a rotating member 36, an elastic member 37, and a cover 38. The basic assembly 31 can include a base 311, a guiding rod 312, and a free wheel 313. The base 311 can substantially be a cylinder. The base 311 can define a first surface 3111 and a second surface 3112. The first surface 3111 can be opposite to the second surface 3112. An installing space 3113 can be defined in the second surface 3112 to receive the free wheel 313. The guiding rod 312 can be positioned on the first surface 3111. A connecting portion 3121 can be positioned on a distal end of the guiding rod 312 away from the base 311. The free wheel 313 can be rotatably positioned in the installing space 3113 and partially protrude out of the second surface 3112. In the illustrated exemplary embodiment, the connecting portion 3121 can be a hook. A plurality of latching grooves 3114 can be defined in the first surface 3111. The plurality of latching grooves 3114 can be evenly arranged along a circumference of the base 311. A number of the latching grooves 3114 can be three.

A receiving cavity 321 can be defined in the base plate 32 to cover the base 311 at the second surface 3112. A bottom surface 3211 of the receiving cavity 321 can be a curved surface. The bottom surface 3211 can protrude out of the base plate 32. A mounting hole 3212 can be defined in the bottom surface 3211 to receive the free wheel 313.

Figure 4:
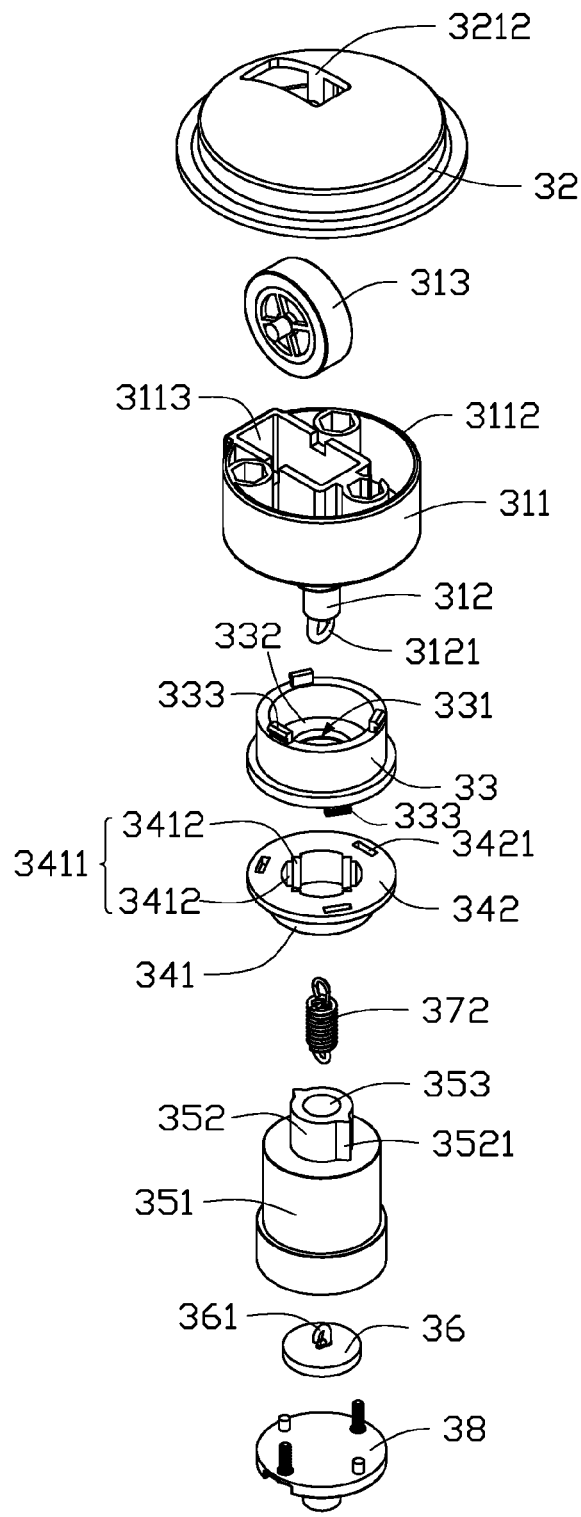
FIG. 4 is similar to FIG. 3, but view from another perspective.

FIG. 3 and FIG. 4 illustrate that the fastening member 33 can be substantially cylindrical. A guiding hole 331 can be defined in the fastening member 33 and can extend through the fastening member 33. The fastening member 33 can be positioned on the first surface 3111, and the guiding rod 312 can pass through the guiding hole 331. In the illustrated exemplary embodiment, a stopping member 332 can be located on an inner surface of the guiding hole 331. The stopping member 332 can resist against the sleeve 35 to limit the movement of the fastening member 33 relative to the sleeve 35. The stopping member 332 can be a ring. In other exemplary embodiments, the stopping member 332 can be a protrusion on the inner surface of the guiding hole 331.

In the illustrated exemplary embodiment, a plurality of latching members 333 can be positioned on opposite end edges of the fastening member 33. The plurality of latching members 333 on one end edge of the fastening member 33 can be engaged to the plurality of latching grooves 3114 to mount the fastening member 33 to the base 311. A number of latching members 333 on each end edge of the fastening member 33 can be three. The number of latching members 333 can be more than or less than three and are not limited to the instant exemplary embodiment.

The restriction member 34 can include a restriction ring 341 and a fastening portion 342. The restriction ring 341 can include a plurality of restriction portions 3411. The plurality of restriction portions 3411 can be positioned on an inner surface of the restriction ring 341. The plurality of restriction portions 3411 can be evenly arranged along the circumference of an inner surface of the restriction ring 341. The fastening portion 342 can connect to the fastening member 33 and can be located away from the base 311. In the exemplary embodiment, each of the restriction portions 3411 can include two restriction teeth 3412. A number of the restriction portions 3411 can be four. The number of restriction portions 3411 can be more than or less than four and are not limited to the instant exemplary embodiment.

In the exemplary embodiment, a plurality of latching hole 3421 can be defined in the fastening portion 342. The plurality of latching holes 3421 can be evenly arranged along the circumference of the fastening portion 342. The plurality of latching holes 3421 can be engaged to the plurality of latching members 333 on other end edge of the fastening member 33 to connect the fastening portion 342 to the fastening member 33. A number of the latching holes 3421 can be three.

The sleeve 35 can include a sleeve body 351 and a resisting portion 352. The sleeve body 351 can be substantially cylindrical. The resisting portion 352 can be positioned on one end of the sleeve body 351 and arranged coaxially with the sleeve body 351. An external diameter of the resisting portion 352 can be smaller than an external diameter of the sleeve body 351. At least one engaging tooth 3521 protrudes from an external wall of the resisting portion 352. The at least one engaging tooth 3521 can be engaged to two restriction teeth 3412 of each of the restriction portions 3411 to limit rotation of the restriction member 34 relative to the sleeve 35. A through hole 353 can be defined in the sleeve 35 and through the entire sleeve 35.

Figure 5:
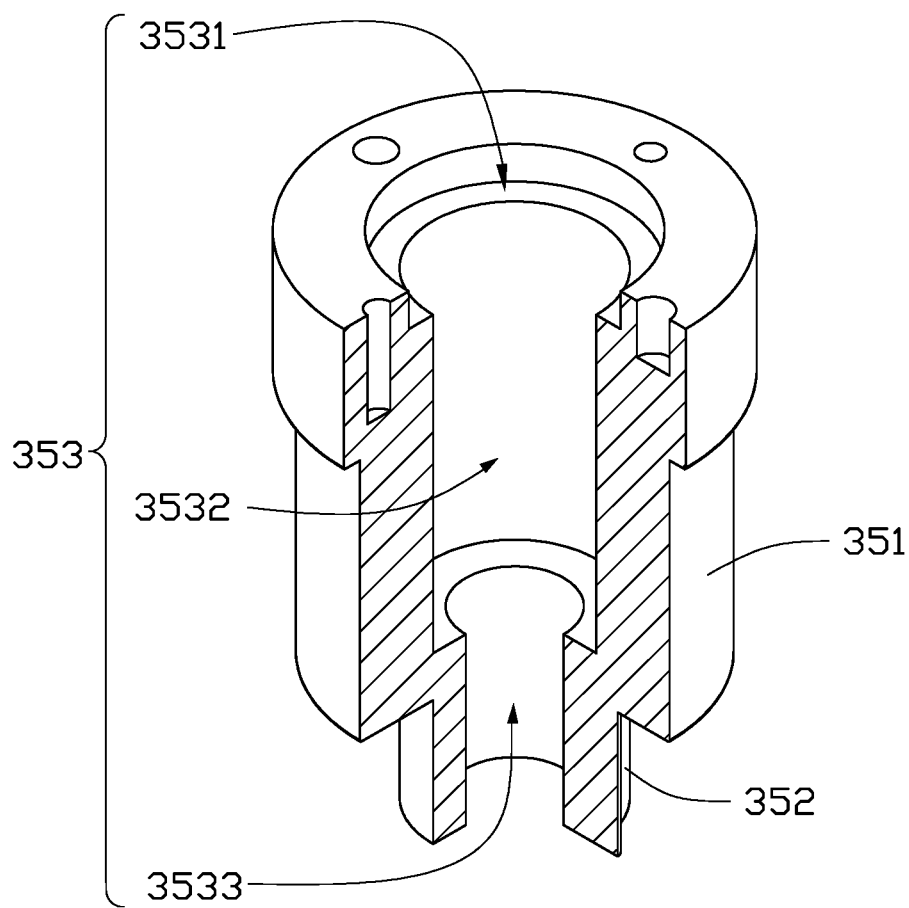
FIG. 5 is an isometric cross-sectional view of a sleeve of the free wheel mechanism of FIG. 3.

FIG. 5 illustrates that the through hole 353 can include a first through hole 3531, a second through hole 3532, and a third through hole 3533. The first through hole 3531, the second through hole 3532, and the third through hole 3533 can be in air communication with each other. The first through hole 3531 can be defined in a first end of the sleeve body 351 away from the resisting portion 352. The third through hole 3533 can be defined in a second end of the resisting portion 352 away from the sleeve body 351. A diameter of the first through hole 3531 can be larger than a diameter of the second through hole 3532. A diameter of the second through hole 3532 can be larger than a diameter of the third through hole 3533. The third through hole 3533 can receive the guiding rod 312.

The rotating member 36 can substantially be circular. A connecting portion 361 can be positioned on the rotating member 36. The rotating member 36 can be positioned in the first through hole 3531, and the connecting portion 361 can be received in the second through hole 3532. In the exemplary embodiment, the connecting portion 361 can be a hook.

The elastic member 37 can include a first elastic member 371 and a second elastic member 372. FIG. 5 illustrates that the first elastic member 371 can be coiled round the guiding rod 312 and can extend through the guiding hole 331. Opposite ends of the first elastic member 371 can resist against the first surface 3111 and the resisting portion 352. The second elastic member 372 can pass through the second through hole 3532. Opposite ends of the second elastic member 372 can respectively connect to the connecting portion 361 of the rotating member 36 and the connecting portion 3121 of the guiding rod 312. In the exemplary embodiment, the first elastic member 371 can be a compression spring, and the second elastic member 372 can be an extension spring.

Figure 6:
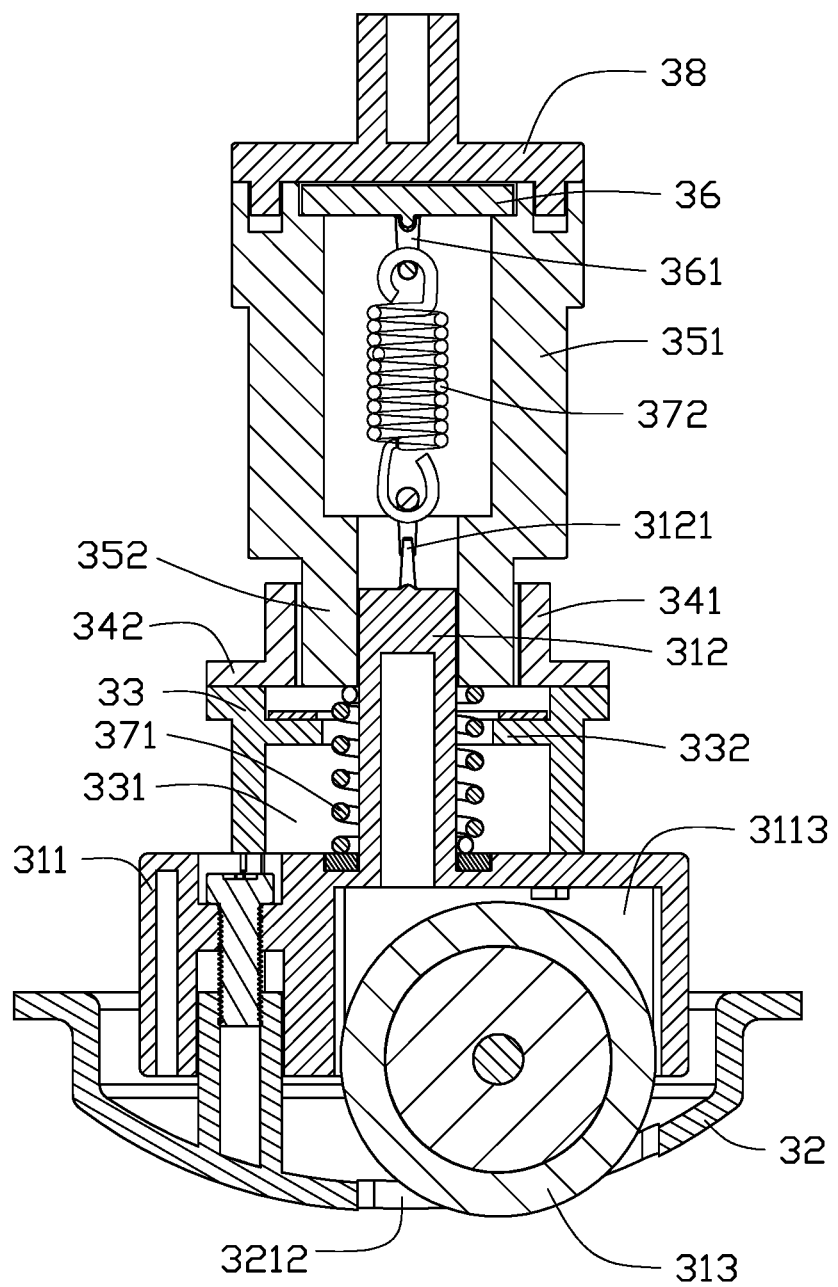
FIG. 6 is a cross-sectional view of the free wheel mechanism of FIG. 2 along line VI-VI.
Figure 7:
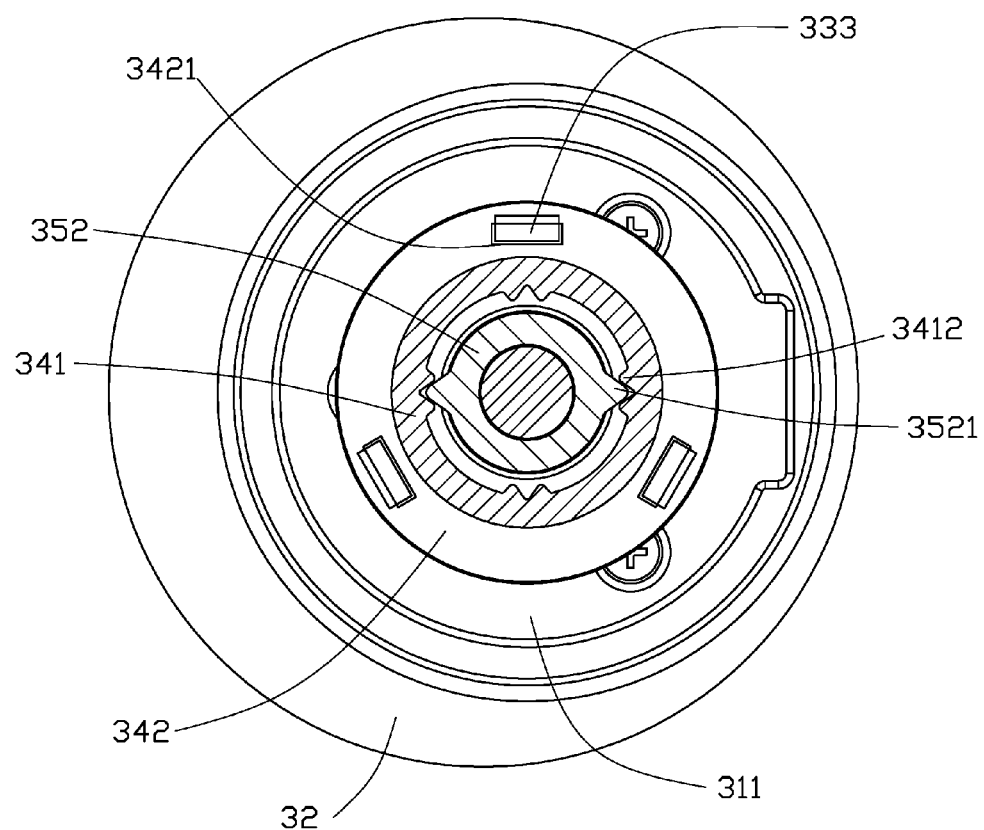
FIG. 7 is a cross-sectional view of the free wheel mechanism of FIG. 2 along line VII-VII.

FIG. 6 illustrates that the cover 38 can be positioned on the end of the sleeve body 351 away from the resisting portion 352. The cover 38 can seal the through hole 353 to prevent dust and other foreign matter from entering into the through hole 353.

In assembly, the free wheel 313 can be rotatably positioned in the installing space 3113. The base 311 can be partially received in the receiving cavity 321, and the free wheel 313 can pass through the mounting hole 3212 and can protrude out of the bottom surface 3211. The first elastic member 371 can be coiled round the guiding rod 312. One end of the first elastic member 371 can resist against the first surface 3111. The plurality of latching members 333 on one end edge of the fastening member 33 can be engaged to the plurality of latching grooves 3114 to mount the fastening member 33 to the base 311. The elastic member 371 can be received in the guiding hole 331. The plurality of latching holes 3421 can be engaged to the plurality of latching members 333 on other end edge of the fastening member 33 to mount the fastening portion 342 to the fastening member 33. The resisting portion 352 can pass through the restriction ring 341. One end of the second elastic member 372 can connect to the connecting portion 3121 of the guiding rod 312, and the second elastic member 372 can pass through the second through hole 3532. The rotating member 36 can be rotatably positioned in the first through hole 3531, and the connecting portion 361 can connect to other end of the second elastic member 372. The cover 38 can be positioned on the end of the sleeve body 351 away from the resisting portion 352. The fastening member 33 can be rotatably positioned on the main body 10. The two driving wheels 20 can be rotatably positioned on opposite sides of the main body 10.

When the moving apparatus 100 moves over rising ground, the base 311 can move away from the ground by pushing the free wheel 313. The fastening member 33 and the restriction member 34 can move towards the sleeve body 351 as the base 311 moves. Therefore, the first elastic member 371 can be compressed by the base 311 and the resisting portion 352 to keep the moving apparatus 100 stable. When the free wheel 313 of the moving apparatus 100 moves on downhill ground, the base 311, the fastening member 33, and a restriction member 34 can move to the ground due to gravity. The second elastic member 372 can be pulled, and the second elastic member 372 can be restored to pull back the base 311, the fastening member 33, and a restriction member 34. Therefore, the moving apparatus 100 has the double shock absorbing effect.

When the moving apparatus 100 moves linearly along by the two driving wheels 20, the at least one engaging tooth 3521 can mesh with the two restriction teeth 3412 of each of the restriction portions 3411 to prevent the free wheel 313 from being jolted by shaking from a straightline. When the moving apparatus 100 turns because of the two driving wheels 20 moving at different speeds, the at least one engaging tooth 3521 can break out of the two restriction teeth 3412 of each of the restriction portions 3411, to freely steer the free wheel 313 relative to the sleeve 35. Therefore, the moving apparatus 100 can make free turns by the free wheel 313.

In at least one exemplary embodiment, the base plate 32, the restriction member 34, and the cover 38 can be removed, and one end of the sleeve 35 can be directly positioned in the guiding hole 331.

In at least one exemplary embodiment, the fastening portion 342 can be removed, and the restriction ring 341 can be directly positioned on the fastening member 331.

As described above, the first elastic member 371 can be coiled round the guiding rod 312. The opposite ends of the first elastic member 371 can resist against the base 311 and the end of the sleeve 35 to stop base 311 moving to the sleeve 35. The opposite ends of the second elastic member 372 can connect to the rotating member 36 and the guiding rod 312 to prevent base 311 from moving away from the sleeve 35. Therefore, the moving apparatus 100 is kept stably in line with the double shock absorbing effect. The moving apparatus 100 can be controlled to make a left or right turn by the restriction member 34.

The exemplary embodiments shown and described above are only examples. Many details are often found in the art such as the other features of a moving apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A free wheel mechanism comprising:
   a basic assembly comprising a base, a guiding rod, and a free wheel, the guiding rod positioned on a first surface of the base, and the free wheel rotatably positioned on the base away from the guiding rod;
   a fastening member on one end of the base, the fastening member defining a guiding hole to receive the guiding rod;
   a sleeve defining a through hole therein, and one end of the sleeve slidingly received in the guiding hole;
   a rotating member in the through hole;
   a first elastic member coiled around the guiding rod, and opposite sides of the first elastic member resisting against the base and the sleeve; and
   a second elastic member received in the through hole, and opposite sides of the second elastic member elastically abutting the rotating member and the guiding rod.

2. The free wheel mechanism as claimed in claim 1, wherein the sleeve further comprises a sleeve body and a resisting portion, the resisting portion is positioned on one end of the sleeve body and resists against one end of the first elastic member, an external diameter of the resisting portion is smaller than an external diameter of the sleeve body, and the through hole is defined in the sleeve body and the resisting portion.

3. The free wheel mechanism as claimed in claim 2, wherein the free wheel mechanism further comprises a restriction member, the restriction member comprises a restriction ring, the restriction ring comprises a plurality of restriction portions, the plurality of restriction portions is positioned on an inner surface of the restriction ring, each of the restriction portions comprises two restriction teeth, at least one engaging tooth protrudes from an external wall of the resisting portion, and the at least one engaging tooth is engaged to two restriction teeth of each of the restriction portions to limit rotation of the restriction member relative to the sleeve.

4. The free wheel mechanism as claimed in claim 3, wherein the through hole comprises a first through hole, a second through hole, and a third through hole, the first through hole, the second through hole, and the third through hole are in air communication with each other, the first through hole is defined in one end of the sleeve body away from the resisting portion, and the third through hole is defined in one end of the resisting portion away from the sleeve body.

5. The free wheel mechanism as claimed in claim 4, wherein a diameter of the first through hole is larger than a diameter of the second through hole, a diameter of the second through hole is larger than a diameter of the third through hole, and the third through hole receives the guiding rod.

6. The free wheel mechanism as claimed in claim 5, wherein a plurality of latching grooves is defined in the first surface, the plurality of latching grooves is evenly arranged along the circumference of the base, a plurality of latching members is positioned on opposite end edges of the fastening member, and the plurality of latching members on one end edge of the fastening member is engaged to the plurality of latching grooves to mount the fastening member to the base.

7. The free wheel mechanism as claimed in claim 6, wherein the restriction member further comprises a fastening portion connected to the restriction ring, a plurality of latching hole is defined in the fastening portion, and the plurality of latching holes is engaged to the plurality of latching members on other end edge of the fastening member to connect the fastening portion to the fastening member.

8. The free wheel mechanism as claimed in claim 2, wherein a stopping member is located on an inner surface of the guiding hole, and the stopping member resists against the resisting portion to limit a movement of the fastening member relative to the sleeve.

9. The free wheel mechanism as claimed in claim 1, wherein the free wheel mechanism further comprises a base plate, a receiving cavity is defined in the base plate to partially receive the base, and a mounting hole is defined in a bottom surface of the receiving cavity to receive the free wheel.

10. The free wheel mechanism as claimed in claim 1, wherein the base further comprises a second surface, the second surface is on an opposite side of the first surface, and an installing space is defined in the second surface to receive the free wheel.

11. A moving apparatus comprising:
    a main body;
    two driving wheel rotatably positioned on opposite sides of the main body;
    a free wheel mechanism positioned on the main body comprising:
    a basic assembly comprising a base, a guiding rod, and a free wheel, the guiding rod positioned on a first surface of the base, and the free wheel rotatably positioned on the base away from the guiding rod;
    a fastening member on one end of the base, the fastening member defining a guiding hole to receive the guiding rod;
    a sleeve defining a through hole therein, and one end of the sleeve slidingly received in the guiding hole;
    a rotating member in the through hole;

a first elastic member coiled around the guiding rod, and opposite sides of the first elastic member resisting against the base and the sleeve; and a second elastic member received in the through hole, and opposite sides of the second elastic member elastically abutting the rotating member and the guiding rod.

12. The moving apparatus as claimed in claim 11, wherein the sleeve further comprises a sleeve body and a resisting portion, the resisting portion is positioned on one end of the sleeve body and resists against one end of the first elastic member, an external diameter of the resisting portion is smaller than an external diameter of the sleeve body, and the through hole is defined in the sleeve body and the resisting portion.

13. The moving apparatus as claimed in claim 12, wherein the free wheel mechanism further comprises a restriction member, the restriction member comprises a restriction ring, the restriction ring comprises a plurality of restriction portions, the plurality of restriction portions is positioned on an inner surface of the restriction ring, each of the restriction portions comprises two restriction teeth, at least one engaging tooth protrudes from an external wall of the resisting portion, and the at least one engaging tooth is engaged to two restriction teeth of each of the restriction portions to limit rotation of the restriction member relative to the sleeve.

14. The moving apparatus as claimed in claim 13, wherein the through hole comprises a first through hole, a second through hole, and a third through hole, the first through hole, the second through hole, and the third through hole are in air communication with each other, the first through hole is defined in one end of the sleeve body away from the resisting portion, and the third through hole is defined in one end of the resisting portion away from the sleeve body.

15. The moving apparatus as claimed in claim 14, wherein a diameter of the first through hole is larger than a diameter of the second through hole, a diameter of the second through hole is larger than a diameter of the third through hole, and the third through hole receives the guiding rod.

16. The moving apparatus as claimed in claim 15, wherein a plurality of latching grooves is defined in the first surface, the plurality of latching grooves is evenly arranged along the circumference of the base, a plurality of latching members is positioned on opposite end edges of the fastening member, and the plurality of latching members on one end edge of the fastening member is engaged to the plurality of latching grooves to mount the fastening member to the base.

17. The moving apparatus as claimed in claim 16, wherein the restriction member further comprises a fastening portion connected to the restriction ring, a plurality of latching hole is defined in the fastening portion, and the plurality of latching holes is engaged to the plurality of latching members on other end edge of the fastening member to connect the fastening portion to the fastening member.

18. The moving apparatus as claimed in claim 12, wherein a stopping member is located on an inner surface of the guiding hole, and the stopping member resists against the sleeve to limit a movement of the fastening member relative to the sleeve.

19. The moving apparatus as claimed in claim 11, wherein the free wheel mechanism further comprises a base plate, a receiving cavity is defined in the base plate to partially receive the base, and a mounting hole is defined in a bottom surface of the receiving cavity to receive the free wheel.

20. The moving apparatus as claimed in claim 11, wherein the base further comprises a second surface, the second surface is on an opposite side of the first surface, and an installing space is defined in the second surface to receive the free wheel.

* * * * *